United States Patent
Cohen et al.

(10) Patent No.: US 6,633,640 B1
(45) Date of Patent: Oct. 14, 2003

(54) METHODS AND APPARATUS FOR ANALYSIS OF LOAD-BALANCED MULTI-SITE CALL PROCESSING SYSTEMS

(75) Inventors: Richard Alan Cohen, Wayland, MA (US); Andrew Derek Flockhart, Thornton, CO (US); Robin H. Foster, Little Silver, NJ (US); Mila Maximets, Winnipeg MB (CA)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/495,656

(22) Filed: Feb. 1, 2000

(51) Int. Cl.[7] .................. H04M 3/36; H04M 3/523; H04M 7/00; H04Q 3/64
(52) U.S. Cl. .............. 379/265.03; 379/112.06; 379/112.07; 379/112.08; 379/112.09; 379/265.06; 379/265.12; 379/266.05
(58) Field of Search .............. 379/265.01, 265.02, 379/265.03, 265.05, 265.06, 265.07, 265.08, 265.1, 265.11, 265.12, 266.01, 266.05, 112.06, 112.07, 112.08, 112.09, 112.1

(56) References Cited

U.S. PATENT DOCUMENTS

| | | | |
|---|---|---|---|
| 5,164,983 A | 11/1992 | Brown et al. | 379/265.03 |
| 5,206,903 A | 4/1993 | Kohler et al. | 379/265.12 |
| 5,325,292 A | 6/1994 | Crockett | 705/9 |
| 5,390,243 A | * 2/1995 | Casselman et al. | 379/266.08 |
| 5,684,964 A | 11/1997 | Powers et al. | 705/11 |

(List continued on next page.)

FOREIGN PATENT DOCUMENTS

| | | | |
|---|---|---|---|
| EP | 0 949 793 A1 | 10/1999 | H04M/3/50 |
| EP | 0 949 794 A1 | 10/1999 | H04M/3/50 |
| EP | 0 982 917 A1 | 3/2000 | H04M/3/523 |
| EP | 0 982 918 A1 | 3/2000 | H04M/3/523 |
| EP | 1 011 256 A2 | 6/2000 | H04M/3/523 |
| EP | 1 017 216 A2 | 7/2000 | H04M/3/51 |
| GB | 2 345 224 | 6/2000 | H04M/3/51 |
| GB | 2 345 819 | 7/2000 | H04M/3/50 |

OTHER PUBLICATIONS

1. "CentreVu® Virtual Routing: Cost–Effective Multisite Routing That Delivers Calls to the Best Place, the First Time," Lucent Technologies Inc., pp. 1–4, Aug. 1998.
2. "CentreVu® Advocate: The Revolutionary Routing Solution That Makes the Best Decision Every Time, Automatically," Lucent Technologies Inc., pp. 1–4, Aug. 1998.

(List continued on next page.)

*Primary Examiner*—Harry S. Hong
(74) *Attorney, Agent, or Firm*—Ryan, Mason & Lewis, LLP (57) ABSTRACT

A multi-site call processing system includes multiple distributed call center sites, and utilizes a load balancing process to distribute calls among the sites for handling by agents. The system generates a multi-site performance score characterizing the performance of the load balancing process. Adjustments may be made in the load balancing process, such as selection of one type of load balancing over another for use at a particular time, based at least in part on the multi-site performance score. The multi-site performance score may be determined using single-site performance measures such as Average Speed of Answer (ASA) and agent occupancy generated across multiple time intervals. The multi-site performance score as generated for a given interval may be, e.g., a ratio of the maximum and minimum values of a single-site performance measure for that interval. As another example, the multi-site performance score may be in the form of a standard deviation of a set of normalized scores generated for the multiple sites across the specified time intervals. Filtering operations may be applied to the data for one or more selected intervals in order to further improve the ability of the performance measure to distinguish relevant variations in the load balancing process.

18 Claims, 7 Drawing Sheets

| INTERVAL BEGINNING | RAW ASA SCORES BY INTERVAL (SEC) | | | | FOUR SITE AVERAGE ASA | NORMALIZED ASA SCORES BY INTERVAL | | | |
|---|---|---|---|---|---|---|---|---|---|
| | SITE A | SITE B | SITE C | SITE D | | SITE A | SITE B | SITE C | SITE D |
| 9:30 | 72 | 85 | 77 | 90 | 81 | 0.89 | 1.05 | 0.95 | 1.11 |
| 10:00 | 110 | 116 | 98 | 105 | 107 | 1.03 | 1.08 | 0.91 | 0.98 |
| 10:30 | 116 | 124 | 114 | 111 | 116 | 1.00 | 1.07 | 0.98 | 0.95 |
| 11:00 | 80 | 67 | 82 | 73 | 76 | 1.06 | 0.89 | 1.09 | 0.97 |
| 11:30 | 63 | 90 | 40 | 54 | 62 | 1.02 | 1.46 | 0.65 | 0.87 |
| 12:00 | 38 | 46 | 49 | 44 | 44 | 0.86 | 1.04 | 1.11 | 0.99 |

U.S. PATENT DOCUMENTS

| | | | | |
|---|---|---|---|---|
| 5,768,360 | A | | 6/1998 | Reynolds et al. ...... 379/211.02 |
| 5,787,163 | A | | 7/1998 | Taylor et al. .......... 379/266.08 |
| 5,828,747 | A | | 10/1998 | Fisher et al. ........... 379/265.12 |
| 5,905,793 | A | | 5/1999 | Flockhart et al. ...... 379/266.06 |
| 6,173,053 | B1 | * | 1/2001 | Bogart et al. .......... 379/266.01 |
| 6,263,065 | B1 | * | 7/2001 | Durinovic-Johri et al. ............ 379/266.03 |
| 6,424,709 | B1 | * | 7/2002 | Doyle et al. ........... 379/265.02 |

OTHER PUBLICATIONS

3. J.P. Anderson et al., "Uncovering Maximum Leverage in Call Center Performance," Call Center Management, pp. 1–3, 1998.

4. "Lucent Technologies CentreVu® Call Center Solutions: CentreVu Virtual Routing," Lucent Technologies Inc., pp. 1–2, 1998.

5. "Lucent Technologies CentreVu® Call Center Solutions: CentreVu Advocate," Lucent Technologies Inc., pp. 1–2, 1998.

6. BCS Public Relations Press Releases, "Lucent Technologies Unveils Breakthrough Call Center Software That Improves Customer Care, Increases Sales and Reduces Costs: Predictive Algorithms Change Call Center Paradigm by Bringing Agent to Caller," Call Center '98, Dallas, Texas, pp. 1–3, Feb. 4, 1998.

7. "CentreVu® Advocate[SM] Research Simulation: Environments with CentreVu Advocate," Lucent Technologies Inc., pp. 1–3, 1998.

8. "Lucent's CentreVu® Advocate: Breakthrough Solutions for Success," Lucent Technologies Inc., pp. 1–4, 1998.

1. John R. Hart, "Intelligent Network Router Applications," Annual Review of Communications, vol. 48, pp. 482–485, 1994.

* cited by examiner

| INTERVAL BEGINNING | RAW ASA SCORES BY INTERVAL (SEC) | | | | FOUR SITE AVERAGE ASA | NORMALIZED ASA SCORES BY INTERVAL | | | |
|---|---|---|---|---|---|---|---|---|---|
| | SITE A | SITE B | SITE C | SITE D | | SITE A | SITE B | SITE C | SITE D |
| 9:30 | 72 | 85 | 77 | 90 | 81 | 0.89 | 1.05 | 0.95 | 1.11 |
| 10:00 | 110 | 116 | 98 | 105 | 107 | 1.03 | 1.08 | 0.91 | 0.98 |
| 10:30 | 116 | 124 | 114 | 111 | 116 | 1.00 | 1.07 | 0.98 | 0.95 |
| 11:00 | 80 | 67 | 82 | 73 | 76 | 1.06 | 0.89 | 1.09 | 0.97 |
| 11:30 | 63 | 90 | 40 | 54 | 62 | 1.02 | 1.46 | 0.65 | 0.87 |
| 12:00 | 38 | 46 | 49 | 44 | 44 | 0.86 | 1.04 | 1.11 | 0.99 |

| INTERVAL BEGINNING | RAW ASA SCORES BY INTERVAL (SEC) | | | | FOUR SITE AVERAGE ASA | NORMALIZED ASA SCORES BY INTERVAL | | | |
|---|---|---|---|---|---|---|---|---|---|
| | SITE A | SITE B | SITE C | SITE D | | SITE A | SITE B | SITE C | SITE D |
| 9:30 | 72 | 85 | 77 | 90 | 81 | 0.89 | 1.05 | 0.95 | 1.11 |
| 10:00 | 110 | 116 | 98 | 105 | 107 | 1.03 | 1.08 | 0.91 | 0.98 |
| 10:30 | 116 | 124 | 114 | 111 | 116 | 1.00 | 1.07 | 0.98 | 0.95 |
| 11:00 | 80 | 67 | 82 | 73 | 76 | 1.06 | 0.89 | 1.09 | 0.97 |
| 11:30 | 63 | 90 | 40 | 54 | 62 | 1.02 | 1.46 | 0.65 | 0.87 |
| 12:00 | 38 | 46 | 49 | 44 | 44 | 0.86 | 1.04 | 1.11 | 0.99 |
| 12:30 | 7 | 9 | 8 | 11 | 8.8 | 0.80 | 1.02 | 0.91 | 1.25 |
| 13:00 | 4 | 4 | 3 | 3 | 3.5 | 1.14 | 1.14 | 0.86 | 0.86 |
| 13:30 | 4 | 3 | 8 | 5 | 5.0 | 0.80 | 0.60 | 1.6 | 1.0 |

FIG. 7

| INTERVAL BEGINNING | ORIGINAL NORMALIZED ASAs | | | | 13:00 INTERVAL FILTERED OUT | | | | 13:00 DATA SUBSTITUTED WITH 1's | | | |
|---|---|---|---|---|---|---|---|---|---|---|---|---|
| | SITE A | SITE B | SITE C | SITE D | SITE A | SITE B | SITE C | SITE D | SITE A | SITE B | SITE C | SITE D |
| 9:30 | 0.89 | 1.05 | 0.95 | 1.11 | 0.89 | 1.05 | 0.95 | 1.11 | 0.89 | 1.05 | 0.95 | 1.11 |
| 10:00 | 1.03 | 1.08 | 0.91 | 0.98 | 1.03 | 1.08 | 0.91 | 0.98 | 1.03 | 1.08 | 0.91 | 0.98 |
| 10:30 | 1 | 1.07 | 0.98 | 0.95 | 1 | 1.07 | 0.98 | 0.95 | 1 | 1.07 | 0.98 | 0.95 |
| 11:00 | 1.06 | 0.89 | 1.09 | 0.97 | 1.06 | 0.89 | 1.09 | 0.97 | 1.06 | 0.89 | 1.09 | 0.97 |
| 11:30 | 1.02 | 1.46 | 0.65 | 0.87 | 1.02 | 1.46 | 0.65 | 0.87 | 1.02 | 1.46 | 0.65 | 0.87 |
| 12:00 | 0.86 | 1.04 | 1.11 | 0.99 | 0.86 | 1.04 | 1.11 | 0.99 | 0.86 | 1.04 | 1.11 | 0.99 |
| 12:30 | 0.8 | 1.02 | 0.91 | 1.25 | 0.8 | 1.02 | 0.91 | 1.25 | 0.8 | 1.02 | 0.91 | 1.25 |
| 13:00 | 1.14 | 1.14 | 0.86 | 0.86 | | | | | 1 | 1 | 1 | 1 |
| 13:30 | 0.8 | 0.6 | 1.6 | 1 | 0.8 | 0.6 | 1.6 | 1 | 0.8 | 0.6 | 1.6 | 1 |
| | STDDEV= 0.186 | | | | STDDEV= 0.191 | | | | STDDEV= 0.180 | | | |

| INTERVAL BEGINNING | RAW ASA SCORES BY INTERVAL (SEC) | | | | RATIO MAX ASA TO MIN ASA |
|---|---|---|---|---|---|
| | SITE A | SITE B | SITE C | SITE D | |
| 9:30 | 72 | 85 | 77 | 90 | 1.25 |
| 10:00 | 110 | 116 | 98 | 105 | 1.18 |
| 10:30 | 116 | 124 | 114 | 111 | 1.12 |
| 11:00 | 80 | 67 | 82 | 73 | 1.22 |
| 11:30 | 63 | 90 | 40 | 54 | 2.25 |
| 12:00 | 38 | 46 | 49 | 44 | 1.29 |

FIG. 10

METHODS AND APPARATUS FOR ANALYSIS OF LOAD-BALANCED MULTI-SITE CALL PROCESSING SYSTEMS

FIELD OF THE INVENTION

The invention relates generally to call centers or other call processing systems in which voice calls, e-mails, faxes, voice messages, text messages, Internet service requests or other types of communications are distributed among a number of service agents for handling, and more particularly to call centers which include multiple geographically-distributed work sites.

BACKGROUND OF THE INVENTION

Call centers distribute calls and other types of communications or work items to available service agents in accordance with various predetermined criteria. A given call center may be implemented in a geographically distributed manner, e.g., as a combination of multiple distributed call center sites at different locations. Such an arrangement is commonly referred to as a multi-site call center or more generally a multi-site call processing system. In multi-site systems of this type, a centralized load balancing process is typically utilized in order to distribute communications among the various sites for processing.

The purpose of the load balancing process is generally to create as close to a single-queue operation as possible within the multi-site system. More specifically, the load balancing process is designed to ensure that all callers are served with as short a wait time as possible, and to keep agents working uniformly across the multiple sites. Callers arriving at about the same time needing the same type of service from agents should thus have about the same amount of wait time regardless of which site serves each caller, and agents at one site should not be idle or under-worked while agents at another site are overworked.

Conventional load balancing processes generally involve comparison of raw data such as Average Speed of Answer (ASA) for each call. More specifically, the conventional processes look at ASA by interval for each agent skill and for each of the sites supporting the skill. In general, the ASAs should be nearly identical and rise and fall together, showing that those who called at about the same time had about the same wait, regardless of which site served the call. Other conventional load balancing processes compare other types of raw data, such as agent occupancy, across the multiple sites.

A significant problem with these and other conventional approaches to load balancing is that comparisons of raw data are often limited in their usefulness because the resulting numbers can be difficult to use in making performance judgments. This is particularly true when comparing one balanced system to another. For example, it may be difficult in such situations to determine whether the performance of load balancing which results in ASAs of 45 seconds, 55 seconds and 65 seconds is better or worse than the performance of load balancing which results in ASAs of 450 seconds, 485 seconds and 500 seconds. Although the callers experiencing the former set of ASAs certainly waited significantly less time, it is not directly apparent which set of ASAs represents the better load balancing.

A need therefore exists for improved data analysis techniques for use in conjunction with load balancing in multi-site call processing systems.

SUMMARY OF THE INVENTION

The invention in an illustrative embodiment provides methods and apparatus for characterization, comparison and adjustment of load balancing processes in multi-site call processing systems.

In accordance with the invention, a multi-site call processing system includes multiple distributed call center sites, and utilizes a load balancing process to distribute calls among the sites for handling by agents. The system generates a multi-site performance score characterizing the performance of the load balancing process. Adjustments may be made in the load balancing process, such as selection of one type of load balancing over another for use at a particular time, based at least in part on the multi-site performance score. The multi-site performance score may be determined using single-site performance measures such as Average Speed of Answer (ASA) and agent occupancy generated across multiple time intervals. The multi-site performance score as generated for a given interval may be, e.g., a ratio of the maximum and minimum values of single-site performance measures for that interval. As another example, the multi-site performance score may be in the form of a standard deviation of a set of normalized scores generated for the multiple sites across the specified time intervals. Each of the normalized scores in the set of normalized scores may be generated by taking a particular single-site performance measure for a corresponding site and dividing it by a site average computed across all of the sites. Graphical representations of the multi-site performance scores may be generated in order to facilitate data analysis.

In accordance with another aspect of the invention, filtering operations may be applied to the data for one or more selected intervals in order to further improve the ability of the performance measure to distinguish relevant variations in the load balancing process. For example, such a filtering operation may be applied to normalized scores for a given one of the time intervals if a particular measure used to generate the normalized scores for each of the multiple sites is below a designated threshold in that interval. The filtering may be configured to remove normalized scores for the given interval from a computation of the multi-site performance score. Alternatively, the filtering may involve setting each of at least a subset of the normalized scores for the given interval to a particular value prior to computation of the multi-site performance score. Other types of filtering may also be used.

Advantageously, the invention provides a better understanding of load balancing performance in multi-site call processing systems, and allows load balancing processes to be characterized, compared and adjusted in a more efficient and meaningful manner than has heretofore been possible. The invention may be implemented in a variety of different types of multi-site call processing systems, and with many different types of load balancing processes. These and other features and advantages of the present invention will become more apparent from the accompanying drawings and the following detailed description.

DETAILED DESCRIPTION OF THE INVENTION

Although the invention will be illustrated below in conjunction with the processing of calls in an exemplary system which includes multiple distributed call center sites, it is not limited to use with any particular type of system configuration or communication processing application. For example, the invention is applicable to the processing of incoming communications, outgoing communications or both. The disclosed techniques can be used with automatic call distribution (ACD) systems, telemarketing systems, private-branch exchange (PBX) systems, computer-telephony integration (CTI)-based systems, as well as in combinations of these and other types of call centers. A call center in accordance with the invention may be configured using any type of network infrastructure, such as, e.g., asynchronous transfer mode (ATM), local area networks, wide area networks, Internet Protocol (IP) networks, etc. The term "call center" as used herein is thus intended to include any type of ACD system, telemarketing system or other communication system which processes calls or other service requests, including voice calls, video calls, multimedia calls, e-mail, faxes, text chat or voice messages as well as various portions or combinations of these and other types of communications. The term "call" as used herein is intended to include any of the above-noted types of communications as well as portions or combinations of these and other communications.

Figure 1:
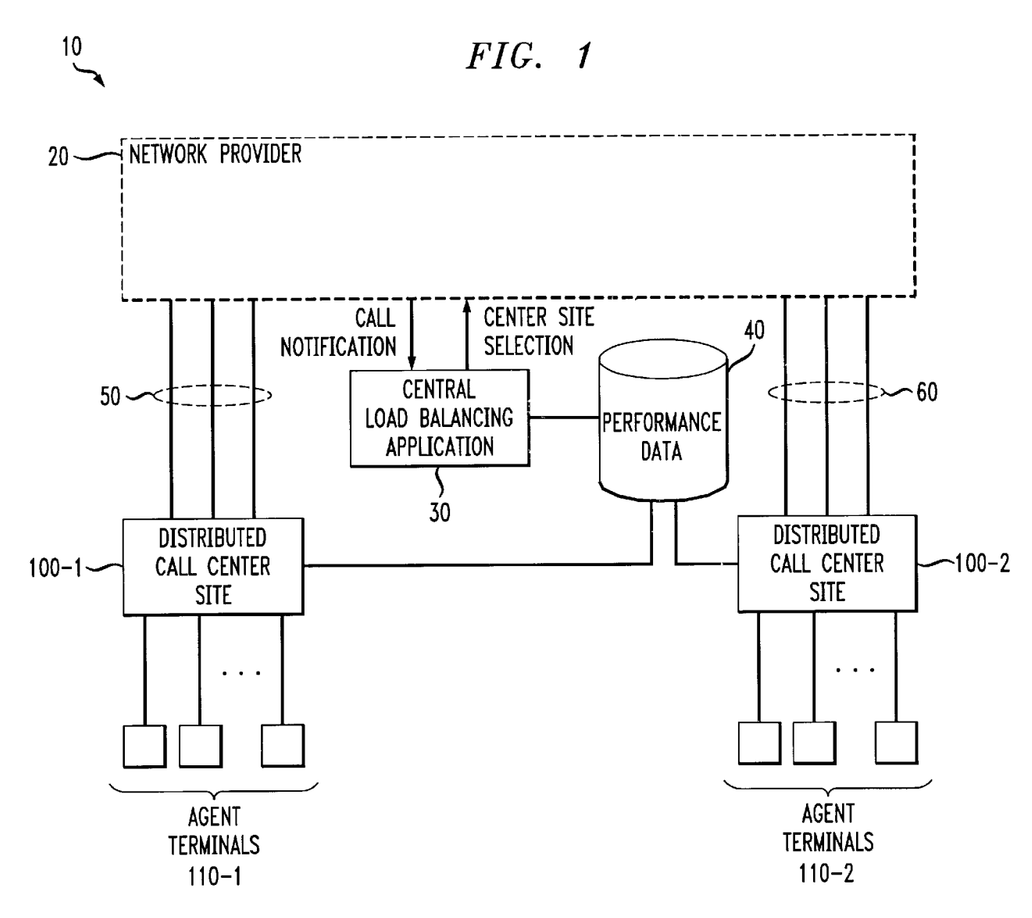
FIG. 1 is a block diagram of an exemplary multi-site call processing system in which the invention may be implemented.

FIG. 1 shows an illustrative call processing system 10 including multiple distributed call center sites. The system 10 includes a network provider 20, a central load balancing application 30, and a set of performance data 40. The network provider 20 is coupled via sets of trunks 50 and 60 to distributed call center sites 100-1 and 100-2, respectively. Associated with each of the distributed call center sites 100-i, i=1,2, . . . , is a corresponding set of agents 110-i. It will be appreciated that although only two sites are shown in FIG. 1, the invention can be implemented in a system having any desired number of sites.

In operation, central load balancing application 30 receives notification of an incoming call from the network provider 20. The central load balancing application 30 then accesses the performance data 40 in order to determine where to route the call, i.e., which of the distributed call center sites 100-i should receive the call. The central load balancing application 30 notifies the network provider 20 of its call center site selection, and the network provider 20 accordingly routes the incoming call to the selected one of the distributed call center sites 100-i over the appropriate trunk. Within the selected site, conventional agent selection and call selection techniques may be used to direct the incoming call to a particular agent in the corresponding set of agents 10-i. This process is repeated for all incoming calls directed to the multi-site call processing system 10. Performance data is collected from the distributed call center sites 100-i and stored in the set of performance data 40 for use by the load balancing application 30 in making future call routing decisions.

Figure 2:
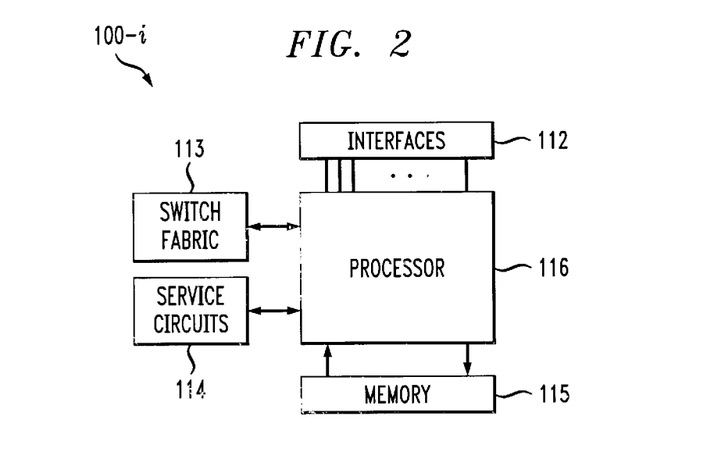
FIG. 2 is a block diagram illustrating one possible implementation of a distributed call center in the multi-site call processing system of FIG. 1.

FIG. 2 shows a simplified block diagram of one possible implementation of a given one of the distributed call center sites 100-i in the system 10 of FIG. 1. The distributed call center site 100-i comprises interfaces 112 to external communication links, a communications switch fabric 113, and service circuits 114 which may be, e.g., tone generators, announcement circuits, etc. The distributed call center site 100-i further includes a memory 115 and a processor 116. The memory 115 may be used for storing, e.g., control programs, data, etc., and may be an electronic memory, a disk-based memory or a combination of these and other memory elements. The processor 116 is configured to execute stored control programs to control the interfaces 112 and the switch fabric 113, to provide call distribution functionality, and to provide storage or processing of e-mails, faxes and other communications. The processor 116 may be, e.g., a microprocessor, a central processing unit (CPU), a computer, an application-specific integrated circuit (ASIC), or various portions or combinations of these and other processing elements.

The central load balancing application 30 may be implemented as one or more software programs running on a system processing element configured in a manner similar to that described in conjunction with FIG. 2. Similarly, the set of performance data 40 may be stored in a memory associated with such a system processing element. These elements may be stand-alone elements within the system 10, or may be wholly or partially incorporated into other system elements, such as, e.g., one or more of the distributed call center sites 100-i, the network provider 20, or other system element.

Additional details regarding call processing techniques that may be utilized in the distributed call center site 100-i may be found in, e.g., U.S. Pat. No. 5,206,903 issued Apr. 27, 1993 in the name of inventors J. E. Kohler et al. and entitled "Automatic Call Distribution Based on Matching Required Skills with Agents Skills," U.S. Pat. No. 5,905,793 issued May 18, 1999 in the name of inventors A. D. Flockhart et al. and entitled "Waiting-Call Selection Based on Anticipated Wait Times," U.S. patent application Ser. No. 09/022,959 filed Feb. 12, 1998 and entitled "Call Center Agent Selection that Optimizes Call Wait Times," U.S. patent application Ser. No. 09/219,995, filed Dec. 23, 1998 in the name of inventors R. A. Cohen and R. H. Foster and entitled "Call Selection Based on Continuum Skill Levels in a Call Center," and U.S. patent application Ser. No. 09/461,904 of A. D. Flockhart et al. filed Dec. 15, 1999 and entitled "Methods and Apparatus for Processing of Communications in a Call Center Based on Variable Rest Period Determinations," all of which are incorporated by reference herein.

It should be noted that the particular arrangement of system 10 and the elements thereof as shown in FIGS. 1 and 2 is by way of example only, and should not be construed as limiting the invention to any particular embodiment or group of embodiments. The invention can be implemented in many other types of multi-site processing system configurations, such as those described in U.S. Pat. No. 5,754,639 issued May 19, 1998 in the name of inventors A. D. Flockhart et al. and entitled "Method and Apparatus for Queuing a Call to the Best Split," which is incorporated by reference herein.

In accordance with the present invention, the multi-site call processing system 10 of FIG. 1 is configured to include capabilities for improved multi-site data analysis. As will be described in greater detail below, the invention processes raw data relating to the call service performance of the distributed call center sites, in order to generate more meaningful "scores" that allow different load balancing methods to be compared under different conditions. Advantageously, the invention reduces the dependence on human judgment in determining which of a given set of load balancing processes results in better overall call center performance.

An illustrative embodiment of the invention first computes a site average by taking individual Average Speed of Answer (ASA) measurements for each site in periodic intervals, and computing a straight average across the multiple sites for each interval. A ratio of each site's ASA to the site average is then computed, by interval, to obtain a normalized score for each site. Using the normalized scores, a standard deviation is calculated across all of the intervals and used as a summary performance score for the load balancing process. A filtering operation may be applied to identify intervals in which all ASAs were sufficiently low, e.g., less than about six seconds, to consider the multi-site system "perfectly" balanced. Any intervals so identified may be eliminated from the determination of the standard deviation. It should be understood that, although the illustrative embodiment uses ASA to compute scores, the invention can be used with any other desired call processing measure, such as, e.g., agent occupancy.

The illustrative embodiment will be described in greater detail with reference to example tables and graphical representations as shown in FIGS. 3 through 10. These examples are with respect to a four-site system including sites denoted Site A, Site B, Site C and Site D. Aside from the particular number of sites used, the four-site system of the following examples is assumed to be of the type previously described in conjunction with FIGS. 1 and 2.

Figure 3:
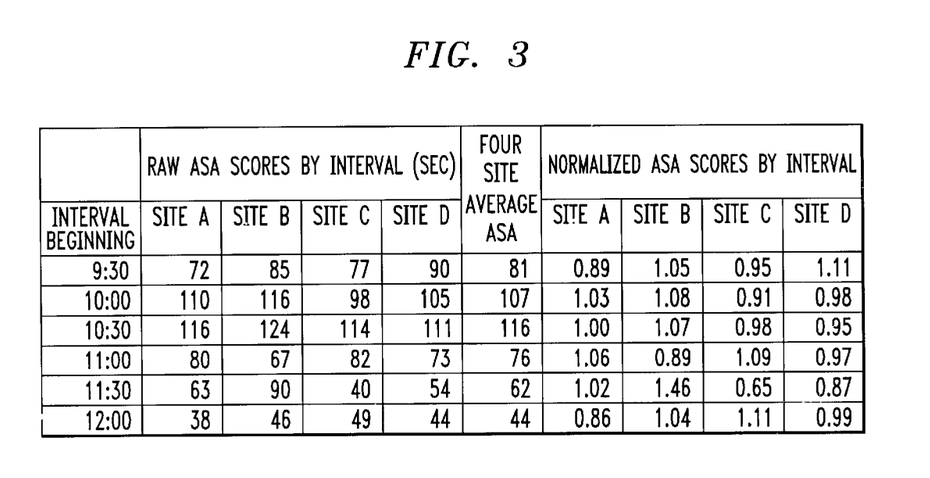
FIG. 3 is a table illustrating the computation of normalized average speed of answer (ASA) scores by interval for an exemplary four-site call processing system, using the techniques of the invention.

FIG. 3 is a table showing exemplary raw ASA data for the four sites A, B, C and D of the four-site processing system, over half-hour intervals beginning at 9:30. Also shown in the table is a four-site average ASA computed for each of the intervals. In accordance with the invention, a normalized ASA score is computed for each of the sites and each of the intervals by dividing the corresponding raw ASA data by the appropriate site average. The results are shown in the last four columns of the FIG. 3 table.

The interpretation of the normalized ASA scores is as follows. A normalized ASA of 1.0 at Site A would mean that in the corresponding interval, Site A had an ASA exactly equal to the four-site average for that interval. A normalized ASA of 0.8 in Site B for the same interval would mean that Site B had an ASA that was lower than the four-site average. A normalized ASA of 1.15 in Site C would mean that Site C had a slower ASA than the four-site average, i.e., higher than the four-site average for that interval.

Each interval in this example therefore produces four normalized scores. These scores should cluster tightly around 1.0 if the system is well balanced and will cluster less so if the system is not well balanced. Advantageously, the normalized scores cluster around 1.0 regardless of whether wait times were high or low, widely varying or smooth, thereby facilitating interpretation of the underlying load balancing performance.

Figure 4:
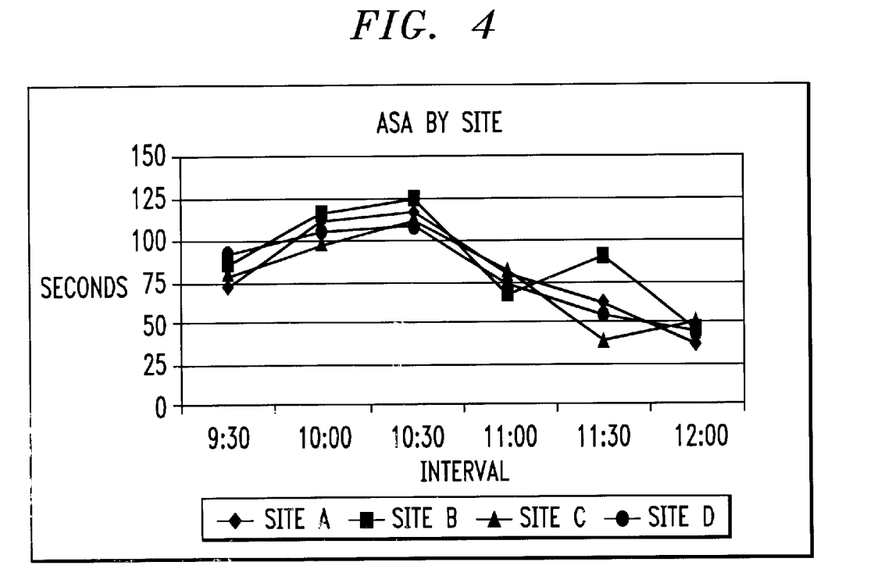
FIG. 4 is a graphical representation of the raw ASA data from the FIG. 3 table.
Figure 5:
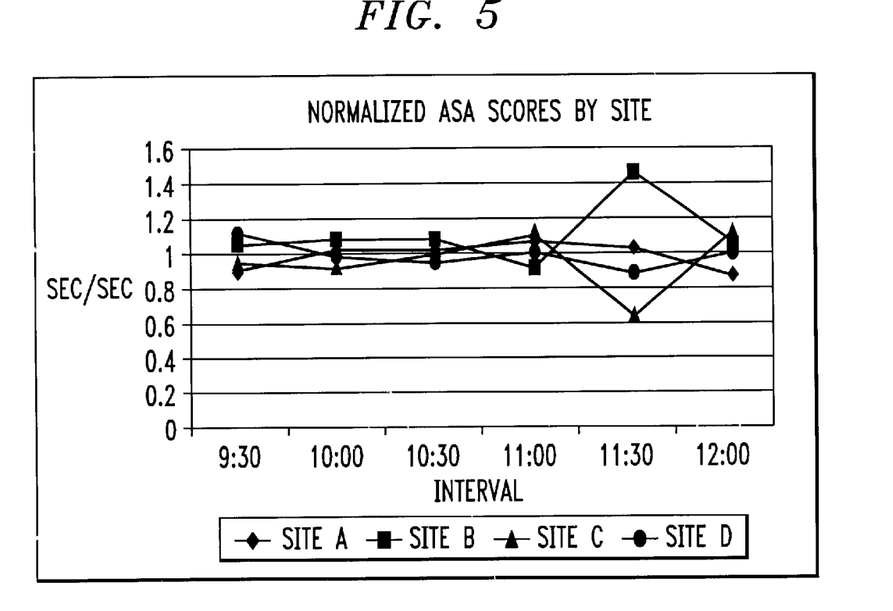
FIG. 5 is a graphical representation of normalized ASA scores generated in accordance with the invention using the ASA data of FIG. 3.

FIGS. 4 and 5 show graphical representations of the raw ASA data and normalized ASA scores, respectively, from the FIG. 3 example. It can be seen from the FIG. 4 graph that there is a relative misalignment in the raw ASA data in the 11:30 interval. In the FIG. 5 graph of normalized ASA scores, the data clusters tightly around 1.0, except for in the 11:30 interval. Comparing the FIG. 5 graph to that of FIG. 4, it can be seen that the use of the normalized ASA scores helps to highlight intervals in which the quality of load balancing was better or worse without introducing confusion based on whether the actual raw ASAs were low or high in the interval.

Figure 7:
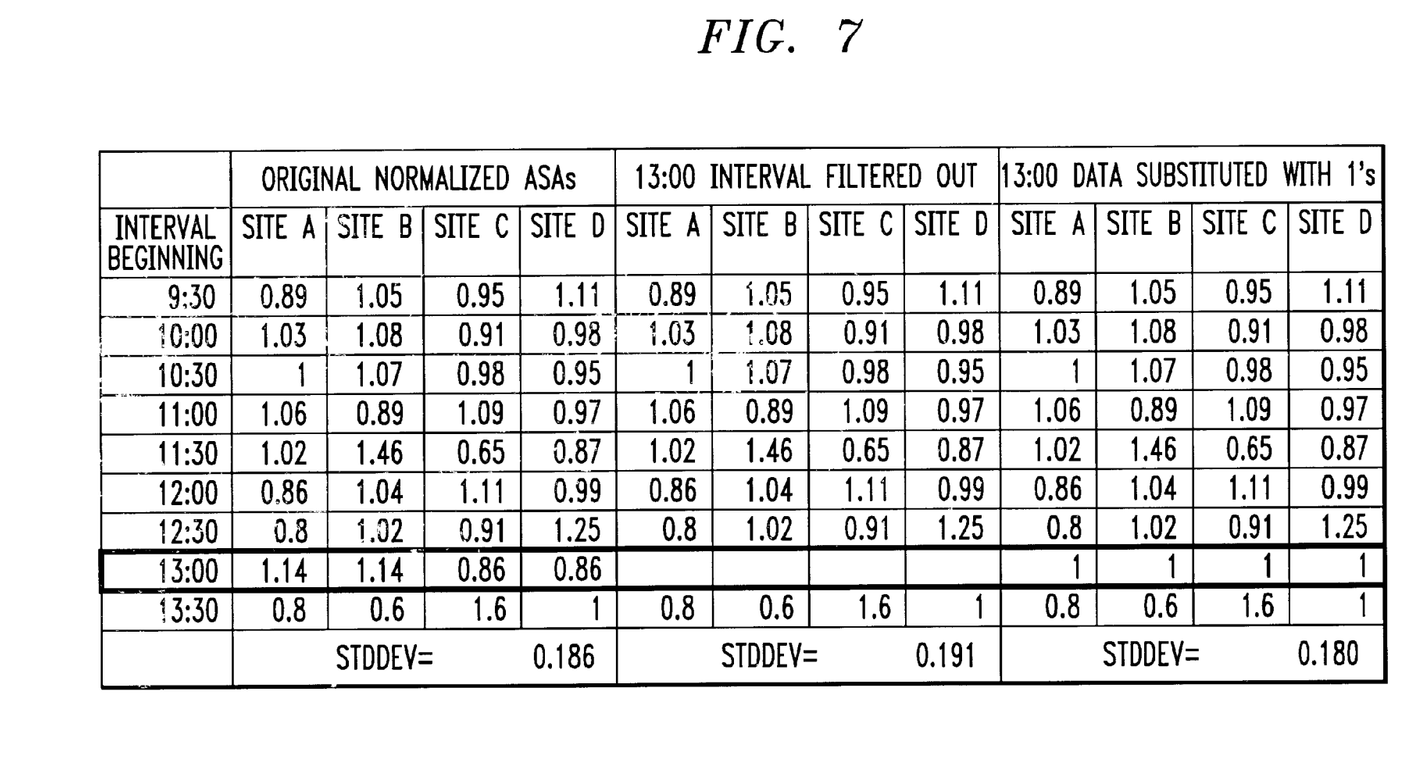
FIG. 7 is a table illustrating the effects of two different types of filtering operations as applied to the normalized ASA scores of FIG. 6 in accordance with the invention.

In accordance with another aspect of the invention, a standard deviation of the normalized ASA scores may be generated and used as a summary performance score. FIG. 7 shows a table in which a standard deviation of normalized ASA scores is computed across the multiple sites and intervals. These normalized ASA scores have a mean of 1.0, by design, as they were computed by comparing each site's ASA to the average calculated for the interval. However, the distribution of these scores around the 1.0 mark can vary. A higher standard deviation shows that the data vary more than a set of data with a lower standard deviation. In other words, lower variance is a sign of better load balancing. This standard deviation thus serves as a single-number benchmark of how well the system was load balanced over a number of intervals.

In accordance with a further aspect of the invention, filtering operations may be applied to particular rows of data in order to further clarify the performance scores. Exemplary filtering operations of this type will be described with reference to the tabular data of FIGS. 6 and 7.

Figure 6:
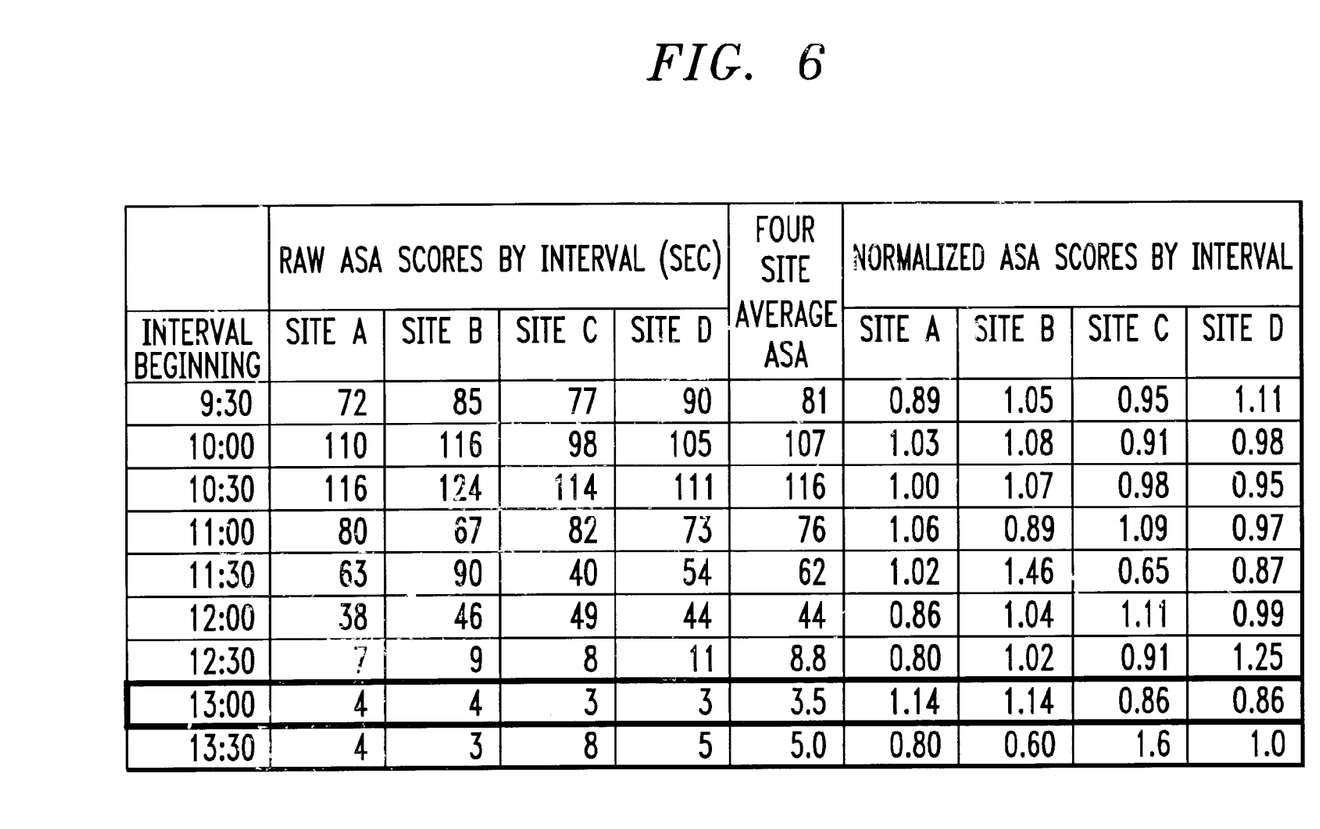
FIG. 6 is a table illustrating the computation of normalized average speed of answer (ASA) scores by interval for an exemplary four-site call processing system, using the techniques of the invention, with a particular interval selected for a filtering operation.

FIG. 6 is a table listing the raw ASA data, four-site average ASA and normalized ASA scores for nine half-hour intervals beginning at 9:30. The entries for the first six intervals are the same as those shown in FIG. 3.

In general, the filtering process in the illustrative embodiment involves setting a threshold ASA below which load balancing would be considered perfect. For example, if within one interval the ASAs were 1, 2, 2, and 3 seconds, the normalized scores would be 0.5, 1.0, 1.0 and 1.5. Both an interval with ASAs of 10, 20, 20 and 30 seconds and an interval with ASAs of 100, 200, 200 and 300 seconds would also have the same sets of normalized scores, i.e., 0.5, 1.0, 1.0 and 1.5. Most call center managers would agree, however, that the interval with all ASAs at 3 seconds or below represents a far superior achievement in terms of performance. For this reason, intervals in which all site ASAs are below a designated threshold, e.g., 6 seconds, 10 seconds, etc. can be filtered in one of a number of different ways. Two examples of this type of filtering are as follows:

1. The normalized scores for the interval to be filtered can be removed from the calculation of standard deviation. Care should be taken to ensure that the data set does not become so small that higher standard deviations result from the low number of data points used.

2. The normalized scores for the interval to be filtered can be replaced with scores of 1.0 before the standard deviation is calculated. This filtering technique keeps the data set the same size as the original unfiltered data set and will lower, or improve, the calculated standard deviation, since the affected intervals now have perfect scores.

Referring again to the FIG. 6 table, a particular interval, in this case the interval beginning at 13:00, is identified as being suitable for filtering. The 13:00 interval is an example of an interval which would meet a 6-second ASA threshold, i.e., all sites had ASAs equal or less than 6 seconds for this interval. This interval should therefore be filtered using one of the two techniques described above.

FIG. 7 shows a table illustrating the above-described filtering operations as applied to the data set of FIG. 6. The table of FIG. 7 includes three sets of columns, the first of which represents the unfiltered data set, resulting in a standard deviation value of 0.186. As described previously, the 13:00 interval in this example can be ignored or eliminated from the data set prior to computation of the standard deviation, as shown in second set of columns in the table of FIG. 7, resulting in the standard deviation value of 0.191. In this case, removing the 13:00 interval from the data reduced the number of points in the data set sufficiently such that the resulting standard deviation value increased. Alternatively, perfect scores of 1.0 could be substituted in place of the normalized ASA scores, as shown in the third set of columns in the table of FIG. 7, resulting in the standard deviation value of 0.180.

Figure 8:
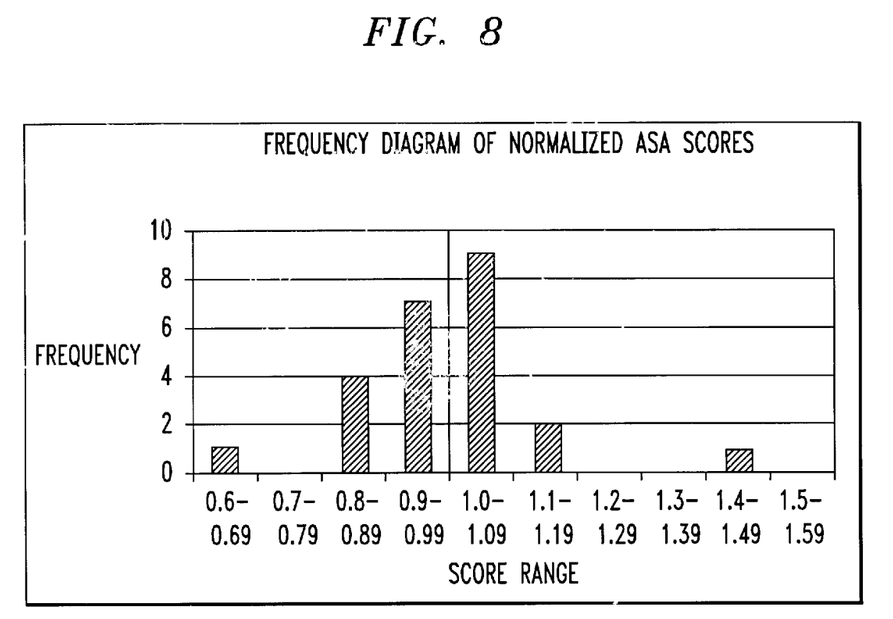
FIG. 8 shows a graphical representation in the form of a frequency diagram of normalized ASA scores in accordance with the invention.

FIG. 8 shows a frequency diagram or histogram of the normalized ASA scores from the tables of FIGS. 6 and 7. Since the mean of the data is 1.0 in this example, it is desirable for the data to be clustered about the 1.0 line in the frequency diagram. Data clustered around the 1.0 line will generally have a lower (better) standard deviation than data that is more widely distributed. Data with extreme outliers will generally have a higher (worse) standard deviation than data with no extreme outliers.

Another aspect of the illustrative embodiment of the invention involves comparison of a ratio of maximum ASA to minimum ASA by interval, without regard to which site has the highest or lowest ASA. A ratio of 1.0 is the theoretical lowest and best possible score. The degree to which particular scores exceed 1.0 indicate potential differences in caller wait time if a call were directed to one site or another.

Figure 9:
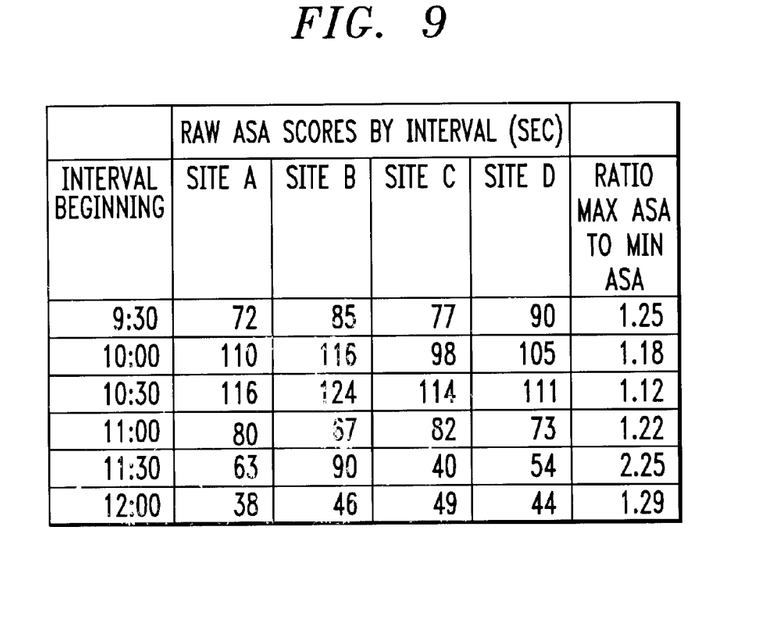
FIG. 9 is a table illustrating the computation of the ratio of maximum ASA to minimum ASA by interval in accordance with the invention using the ASA data of FIG. 3.

FIG. 9 is a table listing the above-described ratio as computed based on the ASA data of FIG. 3 for sites A, B, C and D for intervals beginning at 9:30.

Figure 10:
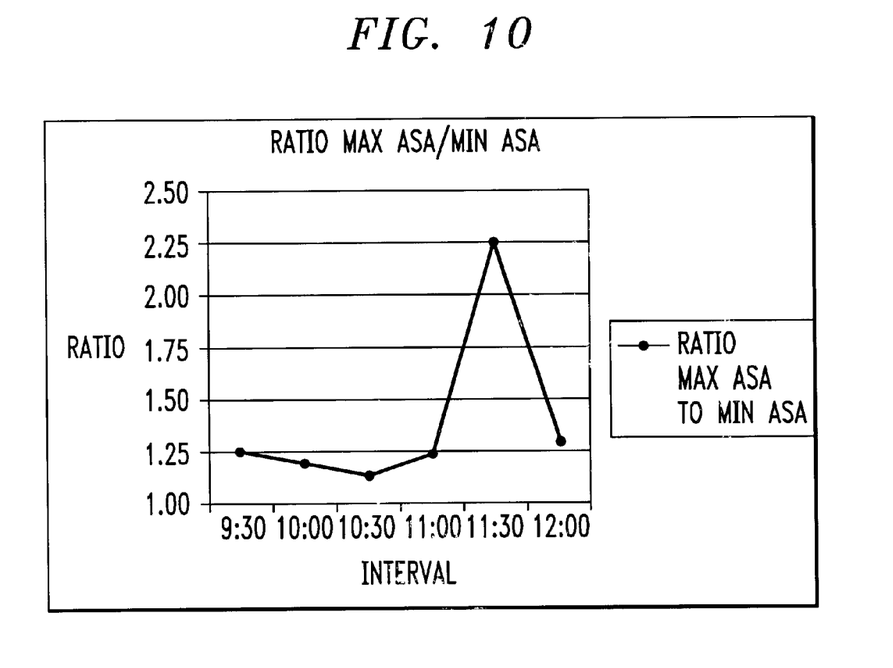
FIG. 10 is a graphical representation of the ratio of maximum ASA to minimum ASA computed in the manner shown in FIG. 9.

FIG. 10 is a corresponding graphical representation of the ratios taken from the last column of the FIG. 9 table. It can be seen from the FIG. 10 graph that the ratios are clustered well below 1.5, except for the 11:30 interval, when the ratio jumps to 2.25. This graph shows that, for the most part, the worst of the ASAs was only about 25% longer than the best of the ASAs, except in the 11:30 interval. Again, the complex set of four-site ASA data is reduced to a single normalized and exaggerated expression of load balancing performance, thereby permitting more efficient and accurate interpretation.

The above-described ratio-based data analysis can be used in other applications. For example, it can be used in conjunction with a Percent in Ratio (PIR) calculation. In the case of the data shown in the FIG. 9 table, five of the six intervals have ratios less than 1.5. So an expression of this result could be 83% of intervals within a ratio of 1.5. If the target ratio were 1.25 instead of 1.5, the PIR calculation would be 67% of intervals within a ratio of 1.25. As another example, this ratio-based data analysis can be used for interval-based comparison of a single system over time, with a different line on the graph for each day.

The ratio-based data analysis may also be subject to appropriate filtering operations. For example, if the ASA for a particular site were zero for a given interval, this value could be replaced with an ASA of one second, so as to prevent a "divide by zero" error. As another example, if all ASAs were zero, or if some were one second and the others were two seconds, the ratio could be filtered and set to 1.0. Such filtering is useful and does not diminish the value of the analysis.

The multi-site performance scores generated in the manner described above are preferably used in conjunction with the multi-site load balancing process. For example, such multi-site scores may be used in central load balancing application 30 of FIG. 1 to determine an appropriate adjustment in the load balancing process so as to achieve a desired balance condition. The term "adjustment" in this context is intended to include, e.g., a switch from one type of load balancing process to another, a change in one or more parameters of a given load balancing process, as well as combinations of these and other types of adjustments.

Examples of applications involving such adjustments include, e.g., a purchase decision of particular load balancing software based on a multi-site score; an adjustment in the administration and staffing of a distributed call centers, with comparison of previous and subsequent multi-site scores used to determine if a desired load balancing improvement has been achieved; a redesign of a load balancing process by a load balancing software provider with comparison of previous and subsequent multi-site scores used to quantify the improvements; implementation of a load balancing process that is able to fine tune itself, i.e., is capable of preserving those adjustments that improved the multi-site performance score and rejecting those that did not; and alteration in a load balancing process for particular situations such as particular times of day based on long-term analysis of trends in multi-site scores. It should be emphasized that these are examples only, and that the invention can be implemented in numerous other applications.

The exemplary system described in conjunction with FIGS. 1 and 2 may be programmed or otherwise configured in a straightforward manner to implement the data analysis, multi-site performance score generation and load balancing adjustment techniques described herein. The particular implementation details associated with a given application will be readily apparent to those skilled in the art, and are therefore not further described herein.

In alternative embodiments of the invention, the described techniques may be applied to adjustment of a load balancing process for entities other than distributed call center sites. For example, the techniques of the invention may be applied to load balancing between multiple skills at a single site. In such an embodiment, a performance score generated in the manner described above may be referred to as a multi-entity performance score.

It should be understood that the techniques of the present invention are not limited to use with voice calls, but are instead more generally applicable to any tasks or other work items that arrive from a customer, e.g., e-mail, fax, text chat, voice over IP, etc., as well as to workflow and/or customer fulfillment generated work tasks that are part of, e.g., a workflow system in which various work tasks dealing with actual or electronic "paperwork," contacts with customers, approvals, etc. must be completed in order to fulfill a specified customer need.

The above-described embodiments of the invention are intended to be illustrative only. For example, it should be noted that the exemplary system configuration shown in FIG. 1 may be altered to incorporate a wide variety of different arrangements of components to provide the processing functions described herein. One such alternative arrangement may be configured such that the call center call distribution functions are implemented in a so-called "off-board" server, e.g., a server outside of an ACD system. In this type of arrangement, one or more servers control the distribution of work to agents in an enterprise, such that the processing functions related to distribution can be moved in whole or in part from the ACD system to the servers. The term "call center" as used herein is intended to include these and other alternative systems in which the present invention can be implemented.

It should also be noted that the invention may be implemented at least in part in the form of a computer-readable medium or other similar medium containing software which, when executed by a computer or other type of processor, will cause the processor to implement the processing functions described above. For example, such software programs may be stored in memory 115 or any other computer readable medium associated with the system 10, and executed by processor 116 or other processing hardware associated with the system 10. These and numerous other alternative embodiments within the scope of the following claims will be apparent to those skilled in the art.

What is claimed is:

1. A method for use in a multi-site call processing system comprising multiple distributed call center sites, the method comprising the steps of:

generating a multi-site performance score characterizing performance of a load balancing process which determines assignment of incoming calls to particular ones of the multiple distributed call center sites; and adjusting the load balancing process based at least in part on the multi-site performance score;

wherein the multi-site performance score is computed as a function of a plurality of individual performance measures each associated with a corresponding one of the multiple distributed call center sites of the multi-site call processing system.

2. The method of claim 1 wherein the multi-site performance score is determined at least in part based on a particular single-site performance measure generated for each of the multiple sites across a plurality of specified time intervals.

3. The method of claim 2 wherein the particular single-site performance measure comprises an Average Speed of Answer (ASA) measure.

4. The method of claim 2 wherein the particular single-site performance measure comprises an agent occupancy measure.

5. The method of claim 2 wherein the multi-site performance score for a given one of the intervals comprises a ratio of a maximum value of the particular single-site performance measure for that interval to a minimum value of the particular single-site performance measure for that interval.

6. The method of claim 1 wherein the multi-site performance score comprises a standard deviation of a set of normalized scores generated for the multiple sites across a plurality of specified time intervals.

7. The method of claim 6 wherein each of the normalized scores in the set of normalized scores is generated by taking a particular single-site performance measure for a corresponding site and dividing it by a site average computed across all of the sites.

8. The method of claim 6 further including the step of filtering the normalized scores for a given one of the time intervals if a particular measure used to generate the normalized scores for each of the multiple sites is below a threshold designated for all of the multiple sites in that interval.

9. The method of claim 8 wherein the filtering step comprises removing normalized scores for the given interval from a computation of the multi-site performance score.

10. The method of claim 8 wherein the filtering step comprises setting each of at least a subset of the normalized scores for the given interval to a particular value prior to computation of the multi-site performance score.

11. An apparatus for use in a multi-site call processing system comprising multiple distributed call center sites, the apparatus comprising:

a load balancing element comprising a processor coupled to a memory, the load balancing element being operative to generate a multi-site performance score characterizing performance of a load balancing process which determines assignment of incoming calls to particular ones of the multiple distributed call center sites, wherein the load balancing process is adjusted based at least in part on the multi-site performance score, and wherein the multi-site performance score is computed as a function of a plurality of individual performance measures each associated with a corresponding one of the multiple distributed call center sites of the multi-site call processing system.

12. An article of manufacture containing one or more software programs for use in a multi-site call processing system comprising multiple distributed call center sites, wherein the one or more software programs, when executed in a processor, cause the processor to perform the steps of:

generating a multi-site performance score characterizing performance of a load balancing process which determines assignment of incoming calls to particular ones of the multiple distributed call center sites; and adjusting the load balancing process based at least in part on the multi-site performance score;

wherein the multi-site performance score is computed as a function of a plurality of individual performance measures each associated with a corresponding one of the multiple distributed call center sites of the multi-site call processing system.

13. A method for use in a call processing system which implements a load balancing process, the method comprising the steps of:

generating a multi-entity performance score characterizing performance of the load balancing process, the load balancing process determining assignment of incoming calls to particular ones of a set of multiple entities; and adjusting the load balancing process based at least in part on the multi-entity performance score;

wherein the multi-entity performance score is computed as a function of a plurality of individual performance measures each associated with a corresponding entity in a set of multiple entities.

14. The method of claim 13 wherein the call processing system comprises multiple distributed call center sites, and the multi-entity performance score characterizes performance of a load balancing process which determines assignment of incoming calls to particular ones of the multiple distributed call center sites.

15. The method of claim 13 wherein the call processing system comprises processing entities for multiple skills, and the multi-entity performance score characterizes performance of a load balancing process which determines assignment of incoming calls to particular ones of the processing entities for the multiple skills.

16. An apparatus for use in a call processing system which implements a load balancing process, the apparatus comprising:

a load balancing element comprising a processor coupled to a memory, the load balancing element being operative to generate a multi-entity performance score characterizing performance of the load balancing process, the load balancing process determining assignment of incoming calls to particular ones of a set of multiple entities, wherein the load balancing process is adjusted based at least in part on the multi-entity performance score, and wherein the multi-entity performance score is computed as a function of a plurality of individual performance measures each associated with a corresponding entity in the set of multiple entities.

17. A method for use in a call processing system which implements a load balancing process, the method comprising the steps of:

generating a multi-entity performance score characterizing performance of the load balancing process, the load balancing process determining assignment of incoming calls to particular ones of a set of multiple entities; and generating a graphical representation of the multi-entity performance score;

wherein the multi-entity performance score is computed as a function of a plurality of individual performance measures each associated with a corresponding entity in a set of multiple entities.

18. A method for use in a multi-site call processing system comprising multiple distributed call center sites, the method comprising the steps of:

generating a multi-site performance score characterizing performance of a load balancing process which determines assignment of incoming calls to particular ones of the multiple distributed call center sites; and generating a graphical representation of the multi-site performance score;

wherein the multi-site performance score is computed as a function of a plurality of individual performance measures each associated with a corresponding one of the multiple distributed call center sites of the multi-site call processing system.

* * * * *